June 24, 1958 W. S. CAMPBELL 2,840,307

DYNAMIC MULTIPLIER CIRCUIT

Filed July 28, 1953 3 Sheets-Sheet 1

FIG. I.

INVENTOR
WILLIS S. CAMPBELL.

BY George Lipkin
B. L. Zangwill
ATTORNEYS

June 24, 1958 W. S. CAMPBELL 2,840,307

DYNAMIC MULTIPLIER CIRCUIT

Filed July 28, 1953 3 Sheets-Sheet 2

INVENTOR
WILLIS S. CAMPBELL

BY George Lipkin
B. L. Zangwill
ATTORNEYS

June 24, 1958 W. S. CAMPBELL 2,840,307

DYNAMIC MULTIPLIER CIRCUIT

Filed July 28, 1953 3 Sheets-Sheet 3

INVENTOR
WILLIS S. CAMPBELL

BY George Sipkin
B. L. Zangwill
ATTORNEYS 2,840,307

DYNAMIC MULTIPLIER CIRCUIT

Willis S. Campbell, Gaithersburg, Md.

Application July 28, 1953, Serial No. 370,903

8 Claims. (Cl. 235—61)

(Granted under Title 35, U. S. Code (1952), sec. 266)

The invention described herein may be manufactured and used by or for the Government of the United States of America for governmental purposes without the payment of any royalties thereon or therefor.

This invention relates in general to computing devices and in particular to electrically operative devices for performing the mathematical operation of multiplication.

In all computer operations one of the most difficult to perform electrically is that of multiplication. The other usual operations of addition, subtraction, and division can be performed with simple circuits, often mere resistance networks or at most, simple electronic circuits. With the conventional simple circuits, no particular difficulty is encountered where the signals to be handled are of a variational nature; the resistance networks used in the addition operation being, for example, capable of equally reliable operation with either alternating current or direct current input signals.

Multiplication, on the other hand, cannot be readily performed with simple circuits with any degree of accuracy particularly where variational signals are encountered which have waveforms which are not of a sinusoidal character.

In view of the limitations of the prior art devices where multiplication of variational signals of non-sinusoidal character is fraught with difficulty, the need for a device capable of operating correctly under such conditions has long been apparent.

Accordingly it is an object of the present invention to provide an electronic multiplying device capable of accurate operation with a variational input.

Another object of the present invention is to provide a multiplier device capable of accurate operation on a variational input irrespective of the waveform of the input.

Another object of the present invention is to provide a stable multiplier unit for operation on variable amplitude direct current control signals.

Other and further objects and features of the present invention will become apparent upon a careful consideration of the following detailed discussion and the accompanying drawings, wherein.

In accordance with the features of the present invention a multiplier device is provided which is capable of receiving two input quantities in the form of direct current potentials (which may be variable) and of providing an output D.-C. potential or meter indication characteristic of the product of the two signals.

The apparatus can be considered to be a two stage amplifier in which the transconductance of each stage is varied in accordance with one of the input quantities. A high or "carrier" frequency signal of selectable, constant, amplitude is applied to the input stage and appears in the output thereof in amplitude dependency upon the transconductance of the two stages. To preserve the sign of the output signals, as well as to achieve zero output whenever one of the input quantities is at its "zero" value, each stage is actually made a combination push-pull stage while a frequency discriminator is included. In a variation of the basic apparatus, simplification of overall circuitry is attained where the multiplier device is to be used under input conditions where one of the input quantities has only one sign (plus or minus), never experiencing variation in the opposite direction.

Figure 1:
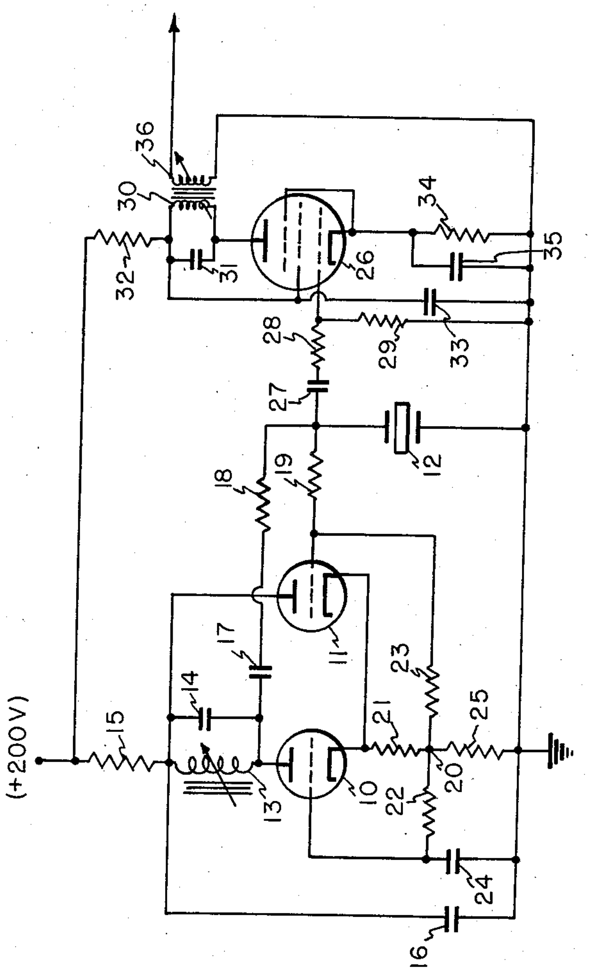
Fig. 1 shows a schematic diagram of a carrier frequency oscillator signals from which are employed as a "vehicle" by means of which the signals are delivered through the multiplier unit proper.

With particular reference now to Fig. 1 of the drawings, an oscillator device for generating the carrier voltage is shown therein that is typical of many different types which could be used in a specific embodiment of the features of the present invention. It will be apparent that any suitable oscillator capable of stable operation at the desired frequencies could be used, and the frequency selected is not particularly critical. However, the frequency should be sufficiently high to where sufficient circuit bandwidth is easily attainable to accommodate the frequency variations in the input and output signals. A typical frequency would be 500 kilocycles per second where input variations up to 1000 cycles per second are expected.

The oscillator proper consists of the triode electron tubes 10 and 11 which are connected in a feedback circuit. Frequency stabilization of the oscillator is by means of the crystal 12. In the overall circuit, the anode of tube 10 is connected to a source of anode potential, typically of 200 volts, through the series path comprising a parallel connected tank circuit consisting of the tunable inductance 13 and capacitance 14 and a decoupling filter consisting of resistance 15 and capacitance 16. Additionally the anode of tube 10 is coupled through capacitance 17 and resistance 18 to a first connector plate of crystal 12, the second connector plate of crystal 12 being grounded. Additionally the first connector plate of crystal 12 is connected to the grid of tube 11 through resistance 19. The anode of tube 11 is connected to the decoupling filter at the juncture of resistance 15 and capacitance 16. The cathodes of tubes 10 and 11 are connected together and joined to a multiple juncture point 20 through resistance 21. Grid return connections for tubes 10 and 11 are made to this juncture point 20 through resistances 22 and 23, respectively, while the grid of tube 10 is additionally by-passed to ground by capacitance 24. In turn the multiple juncture point 20 is connected to ground through resistance 25.

The oscillator circuit as connected is inherently regenerative since, for example, a potential drop at the anode of tube 10, when applied to the grid of tube 11, will reduce the conductivity of tube 11, dropping the potential at the common cathode connection to increase the conductivity of tube 10 producing a further drop at the anode of tube 10 which action continues until either tube 11 is cut-off or tube 10 driven to saturation at which time a reverse action is initiated which later terminates the circuit reverting to the first condition when tube 10 becomes cut-off or tube 11 reaches saturation. This multi-vibrator type of operation is converted into sinusoidal oscillations by the tank circuit consisting of the inductance 13 and capacitance 14 which provides an adjustable frequency-resonant load for tube 10. Stabilization of the operating frequency is provided by the piezo-electric crystal 12.

The signal output from the basic oscillator may be taken off from any of numerous points on the circuit, some of which points are to be preferred over others. Typically it may be taken across the piezo-electric crystal 12.

To prevent variations in the output loading of the amplifier from adversely affecting the operating frequency thereof, a buffer amplifier including the pentode type electron tube 26 is incorporated into the circuit, coupling being made between the crystal 12 and the control grid of tube 26 by the capacitor 27 and resistor 28. Additionally the grid of tube 26 is returned to ground by means of resistor 29. The anode of tube 26 is connected to a source of potential, typically of 200 volts, through the series path consisting of the parallel resonant tank circuit of inductor 30 and capacitor 31 and the decoupling filter of resistance 32 and capacitance 33. Connection of the screen grid electrode of tube 26 is made to any suitable supply potential, typically the filtered potential existing at the juncture of resistor 32 and capacitor 33.

The cathode and suppressor grid of tube 26 are connected together and returned to ground through the cathode biasing circuit consisting of resistor 34 and capacitor 35. The output of the buffer amplifier is taken off by means of the secondary winding 36 which is coupled to the anode inductor 30.

Figure 2:
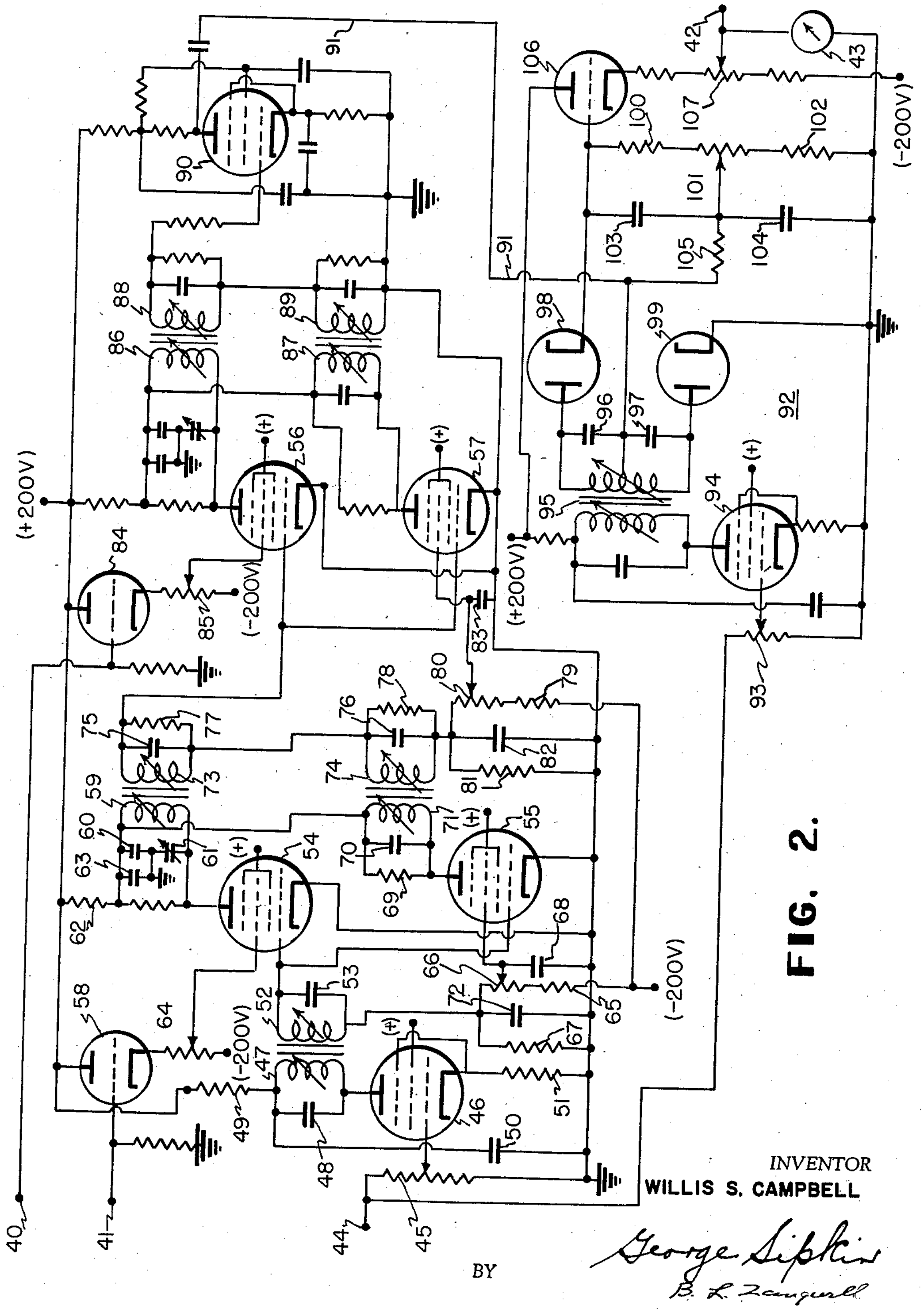
Fig. 2 shows a schematic diagram of a multiplier unit embodying the features of the present invention.

With reference now to Fig. 2 of the drawing, the schematic diagram shown therein is that of a specific multiplier device capable of accurate and stable operation typifying the present invention. This device is arranged to receive the two input quantities to be multiplied at the two terminals 40 and 41, each input being received as a voltage which is either negative or positive with respect to ground to permit inputs of either plus or minus "sense." The output is obtained from terminal 42 for utilization by other apparatus or for viewing on an oscilloscope device. Alternately, the signal output may be indicated on the meter 43 if integration of the product is desired or if the output signal is of substantially a direct-current nature.

The multiplier device receives carrier frequency input signals from the oscillator of Fig. 1 at terminal 44. These signals are taken in amplitude selectable by potentiometer 45 and are applied to the control grid of a pentode type electron tube 46. Tube 46 is connected in a more or less conventional tuned amplifier circuit wherein the anode is connected to a suitable potential source, typically plus 200 volts, through the series circuit consisting of the parallel resonant circuit of inductor 47 and capacitor 48 and the filter circuit of resistor 49 and capacitor 50. The suppressor grid and the cathode of tube 46 are connected together and returned to ground through resistor 51. The screen grid is in turn connected to a suitable polarizing potential source indicated merely by a plus sign (+) to avoid undue circuit complexity.

Anode inductor 47 forms a part of a transformer which includes a secondary winding 52, resonated by means of capacitance 53.

Carrier frequency signals produced across winding 52 are applied in parallel to the control grids of a pair of multi-grid electron tubes 54 and 55 which are shown in somewhat simplified form. Actually, tubes 54 and 55, as well as the subsequent tubes 56 and 57 which will be discussed at a later point in the specification, are of the type called 6L7 which have transconductance characteristics particularly desirable for the purposes of the present invention. Particularly, the transconductance for signals applied to the first control grid varies in an almost direct linear relationship to the potential existing on the second control grid over a wide range of potential variation. Thus for a given effective load resistance, the gain of the tube is directly proportional to the second control grid potential.

In the overall circuit, tube 54 has its cathode connected to ground, its screen grids connected to a suitable source of polarizing potential indicated merely by a plus (+) sign, the second control grid connected through a cathode follower isolating tube 58 to input terminal 41 and the anode connected to a suitable source of anode potential, typically of 200 volts, through a load circuit consisting of inductor 59, capacitors 60 and 61 and a filter circuit consisting of resistor 62 and capacitor 63.

It is well to note that the cathode follower tube 58 has a cathode resistance or potentiometer 64 which is returned to a negative potential of considerable magnitude, so that adjustment thereof makes it possible to select the direct current potential maintained at the second control grid of tube 54. Also it should be noted that the suppressor grids have been omitted from tubes 54—57 to avoid undue circuit complexity, this short cut being made in view of the internal connection of the suppressor grid to the cathode in the 6L7 which is, of course, well known.

Tube 55 is connected in very much the same manner as tube 54, however its second control grid is connected to a direct current biasing potential obtained by voltage divider action of resistance 65, potentiometer 66 and resistor 67 connected between a negative supply potential and ground. Typically the voltage at one end of the potentiometer 66 will be at negative three volts while that at the other end of potentiometer will be at negative thirteen volts. Capacitor 68 provides filtering action operative to hold a constant potential at the second control grid of tube 55. The anode of tube 55 is connected to the anode supply through the load circuit of resistor 69, capacitor 70 and inductor 71 and through the previously mentioned filter circuit of resistor 62 and capacitor 63.

Bias for the first control grids of tubes 54 and 55 is provided by a connection of the lower end of inductance 52 to the juncture of resistor 67 and potentiometer 66, so that these control grids are provided with a biasing potential of negative three volts which is filtered by capacitor 72.

Inductors 59 and 71 are coupled to secondary windings 73 and 74, respectively, which are shunted by capacitors 75 and 76 and resistors 77 and 78. Windings 73 and 74 are connected in series in such a way as to provide signals of opposing polarity which are then applied to the first control grids of tubes 56 and 57. In this composite connection, brought about either by reversal of connections to one of the windings or by winding the coils in opposite directions, output signals from the tubes 54 and 55 are combined in opposition so as to subtract one signal from the other. When tubes 54 and 55 have equal transconductance, the output carrier frequency signals of equal amplitude, but when combined in opposing polarity, a zero output voltage will be obtained. In other circumstances where cancellation does not occur a net signal will be realized which will be of polarity or "phase" dependent upon which tube of tubes 54 or 55 has the greater gain and having an amplitude determined by the difference in the gain of the two tubes. The gain of tube 55 is normally maintained constant as determined by the setting of potentiometer 66 but the gain of tube 54 will vary in accordance with input signals, being either greater or less than that of tube 55 depending upon the polarity of the input signal to terminal 41.

The composite signal from the serially-connected secondary windings 73 and 74 is applied to the first control grids of the tubes 56 and 57 which, as has been previously mentioned are of the 6L7 type. In this circuit, one end of winding 73 is connected to the first control grids while the opposite end of winding 74 is connected to a biasing circuit including the series combination of resistor 79, potentiometer 80 and resistor 81 connected between the negative 200 volt power supply and ground. Resistor 81 is by-passed to ground by capacitor 82 whereas the movable tap of potentiometer 80 is by-passed to ground by capacitor 83. As in the biasing circuit for tubes 54 and 55, the potential at the juncture of resistance 81 and potentiometer 80 is approximately three volts negative while the potential at the juncture of resistance 79 and potentiometer 80 is approximately thirteen volts negative.

In the overall circuit of tubes 56 and 57, the tube cathodes are grounded, and the screen grids are connected to a suitable source of polarizing potential indicated by a positive sign. The second control grid of tube 57 is connected to a direct current biasing potential obtained at the movable tap of potentiometer 80, while the second control grid of tube 56 is connected to the second multiplying signal input terminal 40 through a cathode follower circuit including tube 84 and potentiometer 85.

The connections of the anodes of tubes 56 and 57 are identical to that previously discussed for tubes 54 and 55, in that both include resonant circuits including inductor windings 86 and 87 respectively to a suitable source of anode potential. Likewise, secondary windings 88 and 89 are coupled to windings 86 and 87 and are connected to provide a carrier signal combination in opposition to each other or "subtraction." The resultant carrier signal is dependent in polarity or "phasing" upon the polarity or phase of the signal supplied to the control grids of tubes 56 and 57 and also upon the relative transconductances of tubes 56 and 57. The amplitude of the resultant carrier signal is proportional to the amplitude of the signal supplied to the grids of tubes 56 and 57 as well as to the difference in transconductance between the tubes 56 and 57. Combined signals from the windings 88 and 89 are applied to a carrier frequency amplifier including the pentode type electron tube 90.

Output signals obtained at the anode of tube 90 are conducted through line 91 to a phase discriminator circuit indicated generally by the numeral 92 to which is also supplied as a phase reference the input carrier signal as applied to terminal 44. The phase reference signal reaches the discriminator via potentiometer 93, an amplifier stage including electron tube 94 and a parallel resonant output circuit including the transformer 95 having a center tapped secondary winding to which line 91 is connected. The secondary of transformer 95 is resonated by capacitor 96 and 97 and is connected to the anodes of diode type electron tubes 98 and 99. The cathode of tube 99 is connected directly to ground while the cathode of tube 98 is connected to ground through the series path consisting of resistor 100, potentiometer 101 and resistor 102. Additionally the cathode of tube 98 is by-passed to the tap of potentiometer 101 by capacitor 103 which in turn is by-passed to ground by capacitor 104. To complete the circuit, the tap point of potentiometer 101 is connected to the center tap of the transformer 95 secondary through resistor 105.

In the phase discriminator circuit, signals developed at the cathode of tube 98 are of a polarity and amplitude characteristic of the product of the two input signals applied to terminals 40 and 41, and signals thus obtained in a relatively high impedance circuit are transformed to a low impedance by the cathode follower circuit including electron tube 106. Potentiometer 107 located in the cathode circuit of tube 106 is adjustable to provide control of the direct current level of the output terminal 42 and is normally adjusted to zero potential with respect to ground.

Adjustment of the circuit offers no particular difficulty and in view of the foregoing discussion is practically self-evident. All resonant circuits are adjusted to the frequency of the carrier signal employed. Potentiometer 45 is adjusted to provide carrier frequency signals (sinusoidal) which are of approximately (0.7) volts peak to peak amplitude as measured at the grids of tubes 54 and 55. Potentiometers 66 and 80 are adjusted to provide a bias for the second control grids of the tubes which places them in the linear region of the transconductance grid voltage characteristics, typically at 8 volts negative with respect to ground. Line 91 and the grid of tube 94 are then grounded and potentiometer 107 adjusted to provide zero reading on meter 43, following which potentiometer 101 is adjusted to re-establish this zero reading with the aforementioned grounds removed. Potentiometer 93 is adjusted to produce a signal across the secondary of transformer 95 which is about 15 volts R. M. S. in amplitude. With terminals 40 and 41 both at ground potential, potentiometers 64 and 85 are both adjusted to provide a measurable reading on meter 43. Potentiometer 85 is then adjusted to zero reading on meter 43 which indicates a condition where tubes 56 and 57 have equal transconductance.

Following this, the tubes 56 and 57 are deliberately unbalanced by applying a small D.-C. voltage to terminal 40, terminal 41 remaining at ground potential. Under this condition, potentiometer 64 is adjusted to again obtain zero indication on meter 43, obtained as before with approximately equal potentials on the second control grids of tubes 54 and 55, which indicates balanced transconductances in tubes 56 and 57.

The circuit is then ready to operate and calibrate and the polarities and units of amplitude measurement required at the input terminals 40 and 41 to produce units of output signals and polarities is determined.

Due to the variations possible in winding and connecting the transformers it is not always practical to say definitely what effect input signals of various polarities will have on the output. However, if it were assumed that with positive potentials with respect to ground applied to terminals 40 and 41, the polarity or "phase" of signals applied to the grids of tubes 54, 55, 56, 57 and 90 are the same, the meter 43 will indicate a selected polarity, for example "positive." This could correspond to the multiplication of two positive quantities. Where either terminal 40 or 41 is positive while the other is negative, a polarity or "phase" reversal will occur in the stage connected to the negative terminal so that the signal delivered through line 91 to the discriminator 92 as indicated by meter 43 will be of an opposing polarity or "negative." Where both terminals 40 and 41 are supplied with "negative" signals, double polarity or "phase" reversal will occur so that the "positive" indication will appear on meter 43, thus corresponding to the multiplication of two "negative" quantities to produce a "positive" product.

Figure 3:
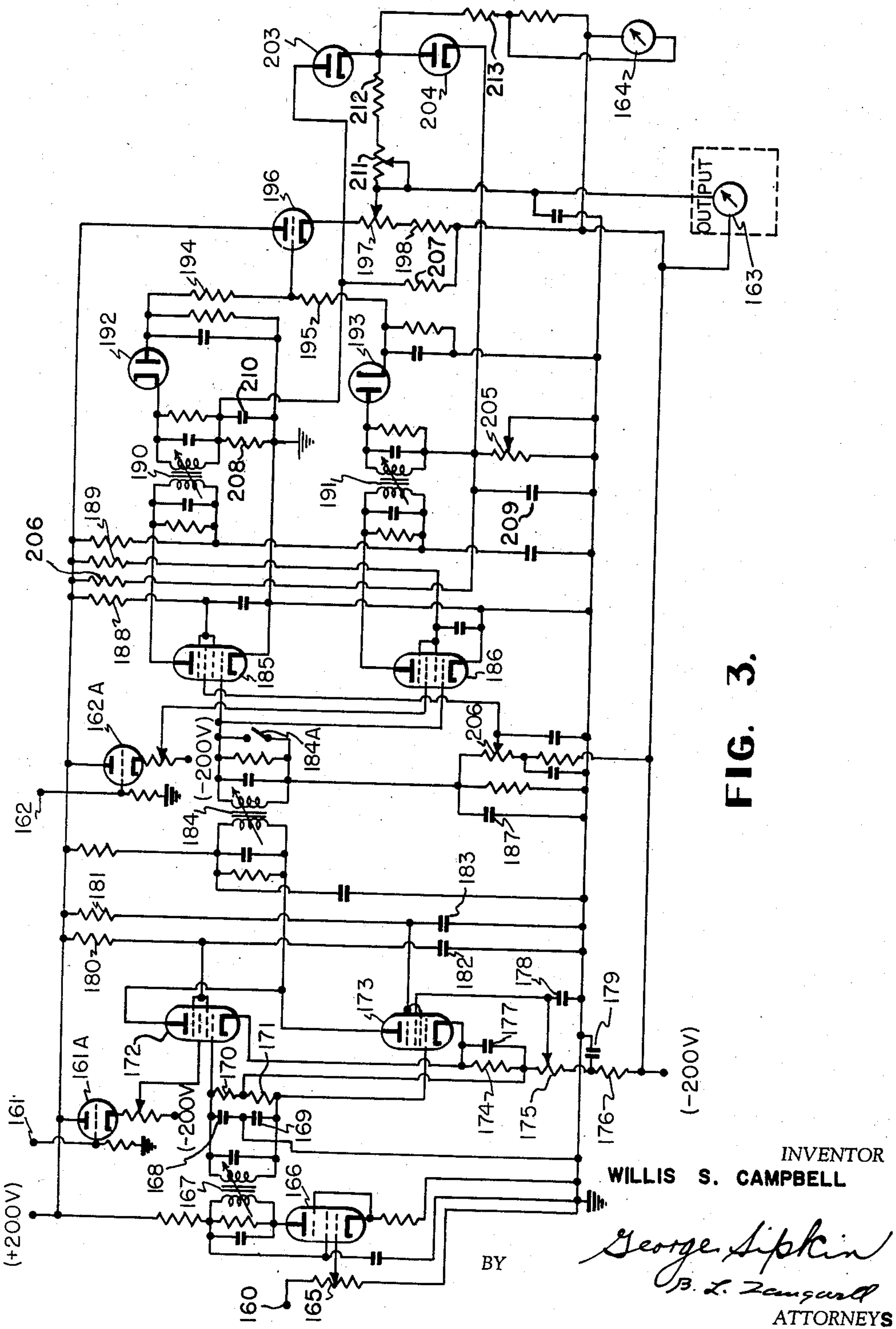
Fig. 3 is a schematic diagram of a second embodiment of the features of the present invention. This second embodiment is simplified from that of Fig. 2 for operation with certain types of input signals.

With reference now to Fig. 3 of the drawing, a simplified multiplier device is shown which is suitable for operation where one of the input quantities has only one polarity, either negative or positive. This simplified circuit, although similar to that of Fig. 2, does not require as many transformers or a discriminator circuit as such, separate demodulation of the signals from the second stage and in opposing polarity being adequate.

The circuit of Fig. 3 receives carrier frequency signals at terminal 160 as provided by an oscillator such as that of Fig. 1. Additionally, input signals to be multiplied are supplied to terminals 161 and 162, the input to terminal 161 being of such a character as to have only a single polarity, either positive or negative. It will be noted that the apparatus cannot "sense" sign differences in the input to terminal 161, but the actual magnitude of the product will be correct regardless of the polarity of the input to terminal 161. The input to terminal 162 on the other hand can vary from negative to positive values and the appropriate indication will be made at the output meter 163. Fig. 3 includes a highly sensitive meter 164 which is included for calibration purposes.

Carrier frequency signals applied to terminal 160 appear across the input level control potentiometer 165 where the portion thereof required for operation of the apparatus may be selected. The tap point of potentiometer 165 is connected to the control grid of pentode type electron tube 166 which is in an amplifier circuit having an output transformer 167 connected to the anode thereof. The secondary of transformer 167 has series-connected capacitances 168 and 169 shunted thereacross and the common connection between the capacitances connected to ground to effectively provide a center tapped secondary winding which delivers equal amplitude but opposed polarity output signals. These push-pull signals are applied to the first control grids of the electron tubes 172 and 173, which are shown as each having four grids, as in the showing of Fig. 2. Tubes 172 and 173 are pentagrid tubes such as type 6L7 wherein, as previously stated, the suppressor grid is internally connected to the cathode. The cathodes of tubes 172 and 173 are connected together and returned to the negative 200 volt power supply through the series combination of resistor 174, potentiometer 175 and resistor 176 which are by-passed by various capacitors 177, 178 and 179. The juncture of resistor 174 and potentiometer 175 is connected to the juncture of resistors 170 and 171 on the grid circuit of tubes 172 and 173 to provide a bias potential for the first grids of tubes 172 and 173 which is several volts negative, typically 3 volts, with respect to the cathodes of these tubes.

The screen grids of tubes 172 and 173 are provided with a suitable direct current polarizing potential obtained for example through resistors 180 and 181 which are connected to the positive 200 volts power supply. The screen grids are also by-passed to ground by means of capacitors 182 and 183. Finally, the anodes of tubes 172 and 173 are connected together and to the primary of transformer 184.

The second control grids of tubes 172 and 173 are employed for the purpose of providing a further signal input means effective to control the transconductance of the tubes. To the second control grid in tube 173 is applied a selectable direct current voltage which is obtained from the tap point of potentiometer 175. On the other hand, the second control grid of tube 172 is connected to a signal input circuit including tube 161A whence it receives from the previously mentioned terminal 161 a first input quantity.

With the circuit as thus described, tubes 172 and 173, having a push-pull input and a parallel output, will not deliver any carrier frequency signal obtained from transformer 167 if the gains of the two tubes are equal. If the gains of the two tubes are not equal, a signal is delivered to appear across the primary of transformer 184 which will be in polarity opposition to the carrier signal applied to the grid of either tube 172 or tube 173 having the greater gain or transconductance. The voltage developed across the primary of transformer 184 will be proportional to the amplitude of the input quantity applied to the second control grid of the tube 172, multiplied by some constant factor $k$.

Multiplication of this carrier frequency signal appearing at the secondary of transformer 184 which is equal in amplitude to the product of a constant and the first quantity as applied to terminal 161 by a second variable quantity occurs in the second half of the circuit which includes the pentagrid electron tubes 185 and 186 which are also of a type having a transconductance controlled by the potential impressed on the second control grids thereof. This circuit does not receive push-pull carrier frequency input signals at the number one control grids but rather the first control grids of tubes 185 and 186 are connected in parallel to the secondary of transformer 184. To provide bias for the first control grids of tubes 185 and 186, one end of the secondary of transformer 184 is connected to a suitable source of negative potential which is by-passed to ground by means of capacitance 187. The full signal developed across the secondary of transformer 184 is thus applied to the first control grids of tubes 185 and 186 in phase with each other. Tubes 185 and 186 have their cathodes connected directly to ground while the screen grid electrodes are connected to a suitable source of polarizing voltage obtained, for example, from the positive 200 volt power supply through resistors 188 and 189. The second control grid of tube 186 is connected to receive the second input quantity to be multiplied from terminal 162 through a cathode follower circuit including the electron tube 162A having a potentiometer in the cathode circuit thereof by means of which the direct current potential of the second control grid of tube is readily adjustable.

The anode of tube 185 is connected to output coupling transformer 190 while the anode of tube 186 is connected to a second output coupling transformer 191. Separate demodulation of the signals from transformers 190 and 191 in opposing polarity is provided by the diode electron tubes 192 and 193. Tube 192 is connected as a negative polarity rectifier to produce at the anode thereof a direct current potential of negative polarity. On the other hand diode tube 193 is arranged in a positive rectifier circuit to produce at the cathode thereof a direct current potential of a positive polarity. These direct current potentials are combined through the resistors 194 and 195 and are applied to the grid in opposed polarity of an electron tube 196 which is a component of a circuit which is basically of the cathode follower type. In this circuit, the anode of tube 196 is connected to the positive 200 volt power supply whereas the cathode of that tube is connected to the negative 200 volt power supply through a series resistance combination including potentiometer 197 and fixed resistor 198. The multiplied output signal is obtained at the tap point of potentiometer 197 and is proportional to the product of the signal voltages applied to terminals 161 and 162. This output quantity can be indicated by the meter 163 which may contain, where integration of the signal is desired, a conventional integrating movement such as a d'Arsonval type meter. Meter 163 is preferably calibrated so that its scale indicates positive and negative values directly with a zero center indication.

The demodulation circuits including diodes 192 and 193 are biased with respect to ground by means of individualized circuits, the circuit including diode 193 being made positive by means of the voltage divider comprising variable resistor 205 and resistor 206 connected between the positive 200 volt supply and ground. A corresponding negative potential is impressed on the circuit including diode 192 by means of the voltage divider composed of resistors 207 and 208. Capacitors 209 and 210 are provided to stabilize the respective voltages and to by-pass all carrier frequency signals to ground. The bias voltages impressed on the demodulation circuits including diodes 192 and 193 are equal and opposite so as to balance each other through the voltage divider composed of resistors 194 and 195 previously mentioned.

In order to protect it, the meter 164 is connected to the movable tap of the potentiometer 197 through resistors 211, 212 and 213, and, in addition the reversely poled diodes 203 and 204 are connected between the junctures of resistors 205 and 206 and resistors 207 and 208 respectively to the juncture of resistors 212 and 213. The diodes 203 and 204 are therefore biased to be non-conducting during normal operation. However, should the voltage at the movable tap of potentiometer 197 deviate from its normal ground potential sufficiently to exceed the polarity of the respective biasing circuits, a current will be conducted through one or the other of the diodes 203 and 204 to produce a voltage drop through resistors 211 and 212 which effectively prevents further voltage deviation.

With the circuit as thus described, operation and calibration is similar to that previously discussed in connection with Fig. 2. It will be noted, of course, that no phase sensing apparatus is provided to determine the phase of the signal impressed on terminal 161 and for this reason it is not possible to distinguish between plus and minus signals as applied to second control grid of tube 172. Phase sensing is provided in the output from tubes 185 and 186 as obtained by the signal subtraction action through resistors 194 and 195, so that the apparatus is capable of sensing polarity variations in the input signals supplied to terminal 162.

Calibration of the apparatus of Fig. 3 is accomplished as follows: All carrier frequency signal input to the first control grids of tubes 185 and 186 is blocked by closing switch 184A which connects these control grids to ground. In this condition the tubes 192 and 193 are inoperative as rectifiers, and potentiometer 197 is adjusted to obtain zero indication on meter 164. Variable resistor 205 is then adjusted to equalize the voltages appearing across resistors 205 and 208.

The switch 184A is then opened and the grid biasing potentiometer 206 for the second control grid of tube 185 is adjusted to place the operating condition of tube 185 in its linear region, typically eight volts negative. With the circuit of tubes 172 and 173 momentarily unbalanced to permit the transmission therethrough of carrier frequency signals, the potentiometer in the cathode circuit of tube 162A is adjusted to obtain zero indication on the calibration meter 164. As with the case of apparatus of Fig. 2, this situation will prevail with approximately equal voltages being applied to the second control grids of tubes 185 and 186.

The next step in the calibration involves the application to the terminal 162 of a small voltage which unbalances the equality of tubes 185 and 186 to permit the transmission therethrough of a carrier frequency signal. Under this condition then the potentiometer 175 is adjusted to place the second control grid of tube 173 at such a potential which provides linear transconductance variation in tube 173. Typically this will be approximately eight (8) volts negative. In turn, the potentiometer in the cathode circuit of tube 161A is adjusted to provide equal transconductance in tubes 172 and 173 likewise obtained preferably with approximately equal potentials on the second control grids of tubes 172 and 173.

With the apparatus set up in accordance with the foregoing scheme calibration of the scale of meter 163 is undertaken by applying unit voltages to terminals 161 and 162 and observing the effect thereof upon the indication of meter 163. This operation is continued for various multiples of this unit voltage at the terminals 161 and 162, observing meter 163 and making appropriate notation on the scale thereof or on a suitable external calibration chart as desired.

In accordance with the features of the present invention as described in the foregoing paragraphs it is seen that a multiplier device capable of rapid and accurate operation with input signals of widely differing characteristics.

Obviously many modifications and variations of the present invention are possible in the light of the above teachings. It is therefore to be understood that within the scope of the appended claims the invention may be practiced otherwise than as specifically described.

What is claimed is:

1. In apparatus for obtaining the product of a plurality of quantities, the combination of first and second amplification means each having two signal amplification paths for amplifying a carrier frequency signal, gain control means for a first signal path of said first amplification means operative to produce selected signal amplification thereby, gain control means for the second signal path of said first amplification means responsive to a first input quantity to vary the amplification thereof in accordance therewith, first combining means for producing primary output signals dependent upon amplitude differences between the signals passing through the first and second signal paths of the first amplification means, means connecting the output of said first combining means to the input of the second amplification means, gain control means for a first signal path of said second amplification means, means operative to produce a selected amplification thereby, gain control means for the second signal path of said second amplification means responsive to a second input quantity to vary the amplification thereof in accordance therewith, and secondary combining means for producing output signals dependent upon amplitude differences between the signals passing through the first and second signal paths of the second amplification means.

2. In apparatus for obtaining the product of a plurality of quantities, the combination of, first controllable gain carrier frequency amplifier means for providing selected amplitude signal amplification of an input carrier frequency signal, second controllable gain carrier frequency amplifier means for providing signal amplification of the input carrier frequency signal in dependency on a first quantity, first combining means for providing opposing polarity combination of the signals from the first and second amplifier means to produce intermediate carrier frequency signals in amplitude dependency on the difference in amplitude between the output signals from the first and second amplifier means, third controllable gain carrier frequency amplifier means for providing selected amplification of said intermediate carrier frequency signals, fourth controllable gain carrier frequency amplifier means for providing amplification of said intermediate carrier frequency signals in dependency on a second quantity to be multiplied, and second combining means for providing opposing polarity combination of the signals from the third and fourth amplifier means to produce output signals in amplitude dependency on the difference in amplitude between the output signals from the third and fourth amplifier means.

3. In apparatus for obtaining the product of a plurality of quantities, the combination of, first controllable gain carrier frequency amplifier means for providing selected amplitude signal amplification of an input carrier frequency signal, second controllable gain carrier frequency amplifier means for providing signal amplification of the input carrier frequency signal proportional to a first quantity, first combining means for providing opposed polarity combination of the signals from the first and second amplifier means to provide intermediate carrier frequency signals having a polarity characteristic of the relative amplification of the first and second amplifier means, third controllable gain carrier frequency amplifier means for providing selected amplification of said intermediate carrier frequency signals, fourth controllable gain carrier frequency amplifier means for providing intermediate carrier frequency signal amplification proportional to a second quantity to be multiplied, and second polarity sensitive combining means for providing opposed polarity combination of the signals from the third and fourth amplifier means to provide output signals in amplitude dependent on the product of the quantities and in polarity dependent upon the relative amplification of the third and fourth amplifier means.

4. In apparatus for obtaining the product of a plurality of quantities, the combination of, a carrier frequency signal generator, first and second adjustable gain amplifier stages responsive to output signals from said carrier frequency signal generator, gain control means for the first amplifier stage operative to produce a reference gain therein, gain control means for the second amplifier stage responsive to a first quantity to control the amplification of said second amplifier stage, combining means for combining the carrier frequency signals from said first and second amplifier stages in polarity opposition whereby intermediate carrier frequency signals are produced having an amplitude dependent upon differences in the gain of the first and second amplifier stages and a polarity characteristic of the stage having the greater gain, third and fourth variable gain amplifier stages responsive to said intermediate carrier frequency signals to produce separate output signals, gain control means for the third amplifier stage for producing selectable gain operation thereof, gain control means for the fourth amplification stage responsive to the second quantity to produce gain variations of the fourth amplifier stage in accordance with the second quantity, second combining means for combining in opposing polarity signal output from the third and fourth amplifier stages to produce output signals of an amplitude dependent upon difference between the amplitudes of the signal outputs therefrom and of a phase relative to the input carrier frequency signal characteristic of the mathematical signs of the input quantities.

5. In apparatus for obtaining the product of a plurality of quantities, the combination of a carrier frequency signal generator, first and second adjustable gain amplifier stages responsive to output signals from said carrier frequency signal generator, gain control means for the first amplifier stage operative to produce a reference gain therein, gain control means for the second amplifier stage responsive to a first quantity to control the amplification of said second amplifier stage, combining means for combining the carrier frequency signals from said first and second amplifier stages in polarity opposition whereby intermediate carrier frequency signals are produced having an amplitude dependent upon differences in the gain of the first and second amplifier stages and a polarity characteristic of the stage having the greater gain, third and fourth variable gain amplifier stages responsive to said intermediate carrier frequency signals to produce separate output signals, gain control means for the third amplifier stage for producing selectable gain operation thereof, gain control means for the fourth amplification stage responsive to the second quantity to produce gain variations of the fourth amplifier stage in accordance with the second quantity, second combining means for combining in opposing polarity signal output from the third and fourth amplifier stages to produce output signals of an amplitude dependent upon the difference in amplitude between the signal outputs therefrom and of a phase relative to the input carrier frequency signal characteristic of the mathematical signs of the input quantities, a discriminator connected to output of said last named means and the said carrier frequency signal generator operative to produce signals of a polarity characteristic of the phase relationship between said signals and of an amplitude dependent upon the amplitude of the output signal from said second combining means.

6. In apparatus for obtaining the product of a plurality of quantities, a signal generator means for producing carrier frequency signals, phase splitting means connected to said carrier frequency signals for producing first and second carrier frequency signals of opposing polarities, first and second variable gain amplifier tubes for amplifying said first and second carrier signals respectively and having a common output, gain control means for the first variable gain amplifier tube for controlling said amplifier tube to produce a selected amplification, gain control means for the second amplifier tube responsive to a first quantity to control the amplification thereof in accordance therewith, third and fourth variable gain amplifier tubes connected to the common output of the first and second amplifier tubes to produce parallel amplification of the signals existent thereon, gain control means for the third amplifier tube operative to produce a selected degree of amplification thereby, gain control means for the fourth amplifier tube responsive to a second quantity for controlling the amplification thereof in accordance therewith, discriminator means connected to the output of said third and fourth amplifier tubes in opposing sense to provide opposed polarity detected signals, and indicator means responsive to said combined signals.

7. In an apparatus for obtaining the product of a plurality of quantities, the combination of a first variable gain amplifier having a gain proportional to a first quantity to be measured, means for applying said first quantity and a carrier reference signal to said first variable gain amplifier, first combining means for algebraically combining a fixed amount of said carrier signal with the output of said first variable gain amplifier, a second variable gain amplifier having a gain proportional to a second quantity to be measured, said second variable gain amplifier having said second quantity applied thereto and being connected to said first combining means for amplifying the ouput of said first combining means, a second combining means for algebraically combining the output of the second variable gain amplifier with the output of said first combining means, and discriminator means for combining the output of said second combining means with a fixed amount of said carrier signal whereby to produce an output which is algebraically proportional to the product of said first and second quantity.

8. An apparatus for obtaining a product from a plurality of quantities, comprising the combination of phase splitting means for producing first and second phase signals from a carrier reference signal, a first variable gain amplifier connected to receive said first phase signal and controlled by a first quantity to be measured, first combining means for algebraically combining said second phase signal with the output of said first variable gain amplifier, a second variable gain amplifier connected to said first combining means and controlled by a second quantity to be measured, and second combining means for algebraically combining the output of said second variable gain amplifier with said first combining means for producing an output proportional to the product of said first and second quantities.

References Cited in the file of this patent

UNITED STATES PATENTS

| | | |
|---|---|---|
| 2,497,883 | Harris | Feb. 21, 1950 |
| 2,519,223 | Cheek | Aug. 15, 1950 |
| 2,661,152 | Elias | Dec. 1, 1953 |

OTHER REFERENCES

Mynall: "Electrical analogue computing," Electronic Engineering, July 1947, pages 214–217.

Somerville: "An electronic multiplier," Electronic Engineering, February 1952, pages 78–80.